US012742501B1

(12) United States Patent
Klein

(10) Patent No.: US 12,742,501 B1
(45) Date of Patent: Sep. 22, 2026

(54) SLIDE SEAL FOR CORNERS

(71) Applicant: Trim-Lok, Inc., Buena Park, CA (US)

(72) Inventor: Kelly Klein, Elkhart, IN (US)

(73) Assignee: TRIM-LOK, INC., Buena Park, CA (US)

( * ) Notice: Subject to any disclaimer, the term of this patent is extended or adjusted under 35 U.S.C. 154(b) by 0 days.

(21) Appl. No.: 18/969,604

(22) Filed: Dec. 5, 2024

Related U.S. Application Data

(60) Provisional application No. 63/607,833, filed on Dec. 8, 2023.

(51) Int. Cl.
*F16J 15/3284* (2016.01)
*B60P 3/34* (2006.01)
*F16J 15/02* (2006.01)

(52) U.S. Cl.
CPC ............. *F16J 15/3284* (2013.01); *B60P 3/34* (2013.01); *F16J 15/025* (2013.01); *F16J 15/027* (2013.01)

(58) Field of Classification Search
CPC ...... F16J 15/3284; F16J 15/025; F16J 15/027; B60P 3/34
See application file for complete search history.

(56) References Cited

U.S. PATENT DOCUMENTS 3,106,406 A * 10/1963 Liebig .................. F16J 15/3272 277/560
9,625,037 B2 * 4/2017 Young ....................... B60P 3/34
11,287,044 B1 * 3/2022 Maloney ................... B60P 3/34
11,318,827 B1 * 5/2022 Maloney .................. B60J 10/00
12,241,550 B2 * 3/2025 Cackley .................. B60R 13/06
2014/0225333 A1 * 8/2014 Siegel ....................... B60P 3/32 277/630
2016/0003358 A1 * 1/2016 Young .................... F16J 15/027 277/645
2017/0234430 A1 * 8/2017 Fadgen ................ F16J 15/3464 277/500
2018/0043844 A1 * 2/2018 Ksiezopolski ......... F16J 15/027
2018/0080558 A1 * 3/2018 Maloney ................ F16J 15/027
2020/0386311 A1 * 12/2020 Mathias ................. F16J 15/061
2021/0229590 A1 * 7/2021 Ksiezopolski .......... B60R 13/06
2021/0237092 A1 * 8/2021 Malkamäki ............... B02C 2/04

FOREIGN PATENT DOCUMENTS

WO WO-0230705 A1 * 4/2002 ................ B60P 3/34

* cited by examiner

*Primary Examiner* — Eugene G Byrd
(74) *Attorney, Agent, or Firm* — Cislo & Thomas LLP

(57) ABSTRACT

A slide seal for an RV to seal the space in between the corner of a slide-out room of the RV and a wall of the RV, the slide seal having a base to fasten to the wall, a flap seal extending from the base at one end, a bulb seal extending perpendicular to the base at an opposite end, a horn extending from the bulb seal, curving upwardly from the bulb seal and away from the flap seal, and a notch created through the flap seal and the base to create two sections of the base and flap seal so that the first section of the flap seal and base can be bent at approximately a 90 degree angle relative to the second section of the flap seal and base to fit into the corner space in between the slide-out room and the RV wall.

20 Claims, 7 Drawing Sheets

SLIDE SEAL FOR CORNERS

TECHNICAL FIELD

This invention relates to seals for recreational vehicles.

BACKGROUND

Recreational vehicles (RV) are very popular for vacationing and traveling, providing the amenities of a home in a mobile package. The major downside of the RV is the size and number of rooms. To account for the small size and number of rooms, some RVs offer slide-out rooms. A slide-out room is a room or compartment that is housed in the main living compartment of the RV, but can slide out perpendicularly from the main living compartment so as to create an additional room adjacent to the main living compartment. When ready for departure, the slide-out room can slide back into the main compartment again.

A main problem with slide-out rooms is that debris and water can enter into the RV through the gaps created in between the walls of the slide-out room and the wall of the RV defining the opening for the slide-out room. The corners of the walls defining the opening for the slide-out room are particularly problematic because in general, two seals are used to seal the corners, which inherently leaves a small gap in between the two seals. A unique one-piece seal was developed to create a tight seal at the corners of the slide-out rooms, and described in U.S. Pat. No. 11,287,044, the contents of which are incorporated here in their entirety by this reference. In some instances, however, a small opening 10 can still exist in the corner allowing light to shine through as shown in FIG. 1.

SUMMARY

The present invention is directed to a slide seal for creating a tight seal at the corners of a slide-out room using a single elongated slide out seal having a notch to allow the slide seal to bend around the corner at the notch creating a one-piece seal that can seal a gap between the corner of the slide-out room and the wall of the RV defining the opening for the slide-out room. The slide seal comprises a base, a flap seal extending from the base on one end, and a bulb seal at the opposite end of the base. When the slide seal is placed on its flap seal and base, the bulb seal projects upwardly from the base creating a gap between the base and the bulb seal. The base and the flap have a notch created therethrough to allow the base to be bent at approximately a 90 degree angle causing a first portion of the flap seal on one side of the notch to slide over a second portion of the flap seal on the opposite side of the notch and tuck under the bulb seal inside the gap without having to lift the bulb seal. In some embodiments, the notch in the base can have a triangular shape to assure a quality fit with no gaps through which light may pass.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
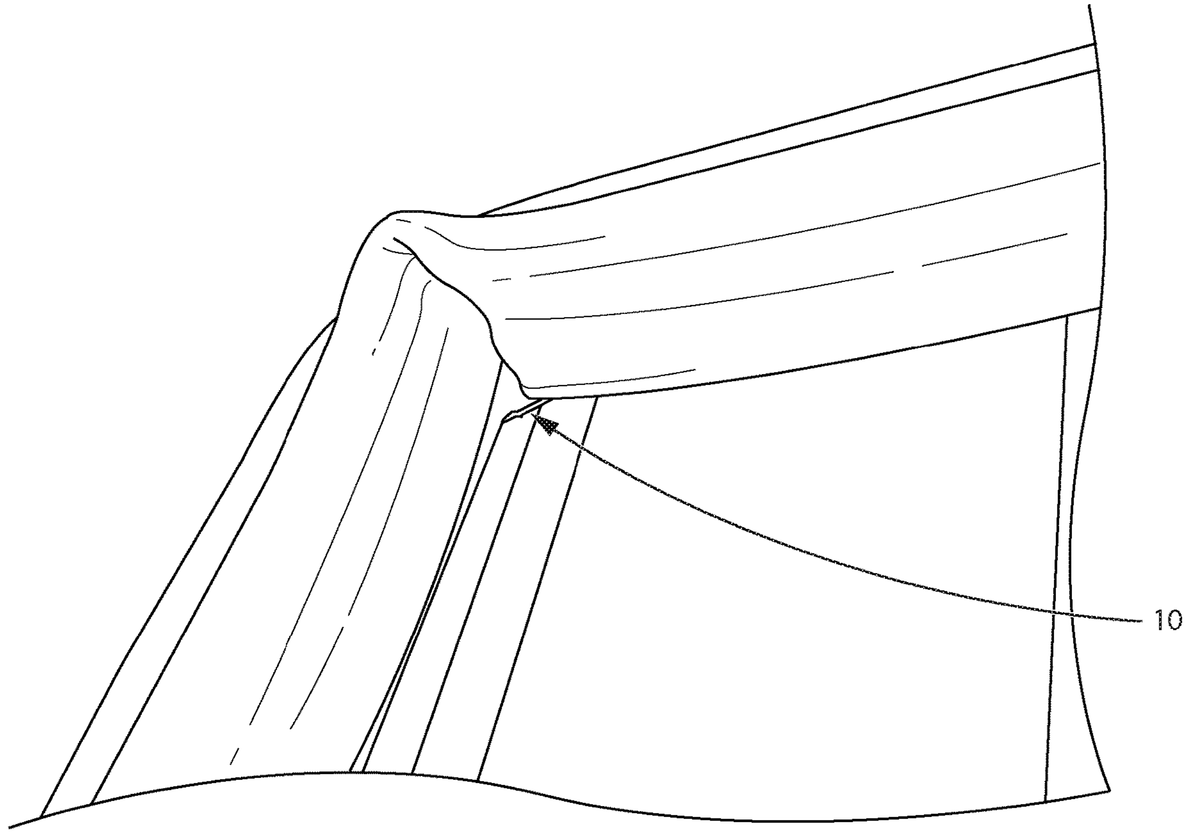
FIG. 1 shows a perspective view of a prior art corner seal.
Figure 2:
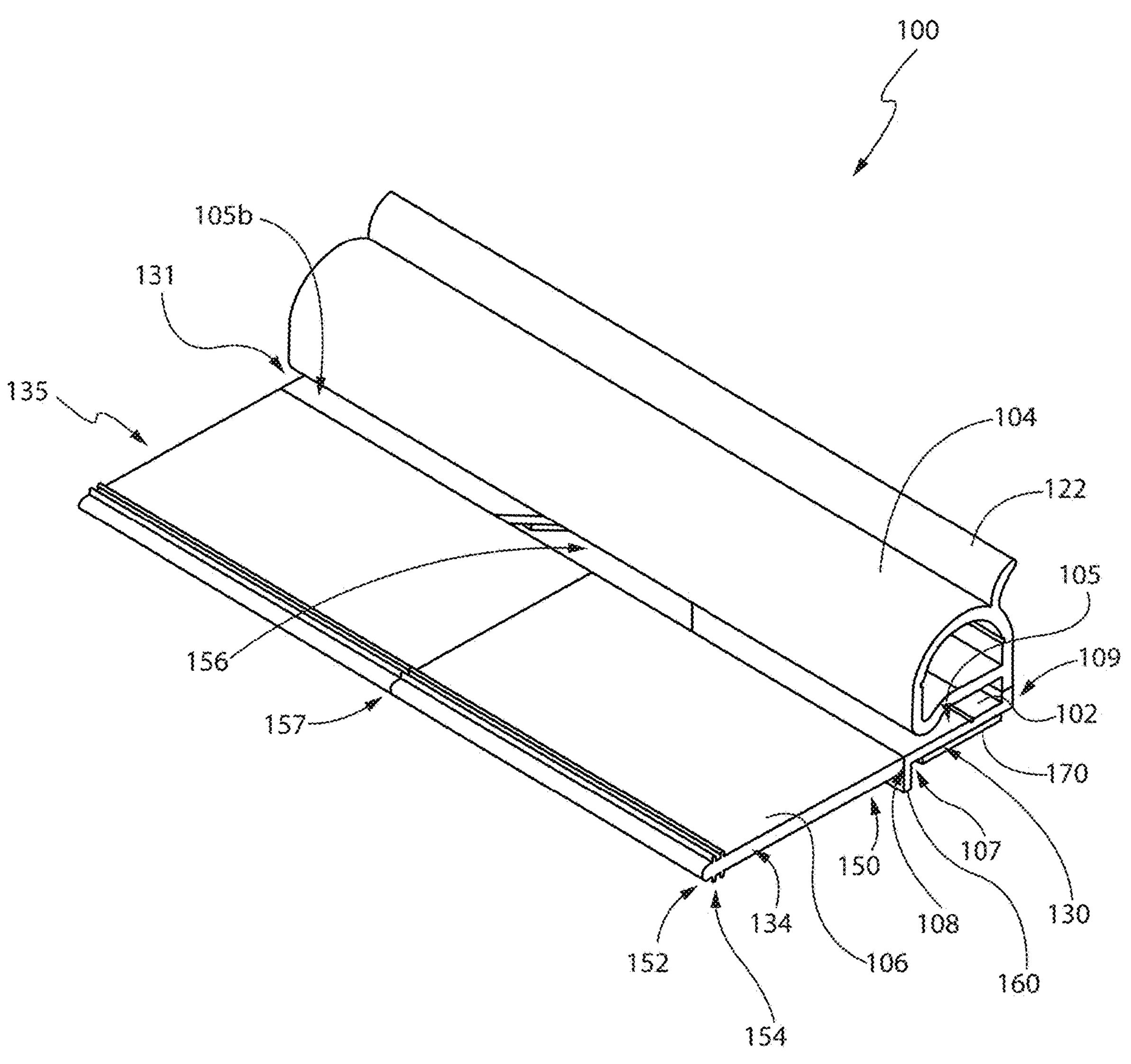
FIG. 2 shows a perspective view of a section of an embodiment of the present invention.

With reference to FIG. 2, the invention of the present application is directed towards a seal 100 to seal a space at a corner of a slide-out room and a wall (defining the opening for the slide-out room) of a recreational vehicle to reduce dirt, water, dust, and debris from entering the recreational vehicle as the slide-out room moves in and out. The seal comprises a base 102, a bulb seal 104 attached to the base 102 at one end, and a flap seal 106 attached to the base 102 at the opposite end, with a notch 156 defined in a portion of the base 102, and a slit 157 defined in a portion of the flap seal 106, to separate the base 102 and the flap seal 106 into two parts (or portions), but not the bulb seal 104. By creating a notch 156 in a portion of the base 102 and a slit 157 in a portion of the flap seal 106, the seal 100 can be bent at a 90 degree angle at the notch 156 (as shown in FIG. 1) so that the seal 100 can fit into the corner.

In the preferred embodiment, the base 102 can have a front end 108 and a back end 109 opposite the front end 108; a first lateral side 130 adjacent to the front end 108 and the back end 109; a second lateral side 131 opposite the first lateral side 130 and adjacent to the front end 108 and the back end 109; a first surface 105 adjacent to the first lateral side 130, the second lateral side 131, the front end 108, and the back end 109; and a second surface 107 opposite the first surface 105 and adjacent to the first lateral side 130, the second lateral side 131, the front end 108, and the back end 109. The base 102 defines the notch 156 in between the first lateral side 130 and the second lateral side 131 that extends from the front end 108 towards the back end 109 of the base 102. Preferably, the notch 156 extends substantially to the back end 109 of the base 102. In some embodiments, the notch 156 can extend through the back end 109 of the base 102.

The flap seal 106 can be attached to the base 102 at the front end 108 of the base 102. The flap seal 106 comprises a proximal end 150 attached to the base 102, a free end 152 opposite the proximal end 150, a first lateral end 134 adjacent to the proximal end 150 and the free end 152, and a second lateral end 135 opposite the first lateral end 134 and adjacent to the proximal end 150 and the free end 152. The flap seal 106 and the base 102 are substantially coplanar. As such, in the preferred embodiment, the flap seal 106 extends generally in the same plane as the base 102, although the flap seal 106 can be thicker than the base 102. The flap seal 106 defines a slit 157 in between the first lateral end 134 and the second lateral end and leading into the notch 156. The slit 157 extends from the notch 156 through the free end 152 of the flap seal 106, wherein the notch 156 is configured to allow the base 102 to bend 90 degrees at the notch 156. When the base 102 is bent at 90 degrees, a portion of the flap seal 106 enters a gap 140 created in between the bulb seal 104 and the top surface 105 of the base 102. The gap 140 is created by a back wall 124 extending from the top surface 105 of the base 102 towards the bulb seal 104. Opposite the back wall 124, at about the junction where the flap seal 106 and base 102 meet, there can be a stop 160 projecting perpendicularly from the second surface 107 in the direction opposite the bulb seal 104.

Figure 3:
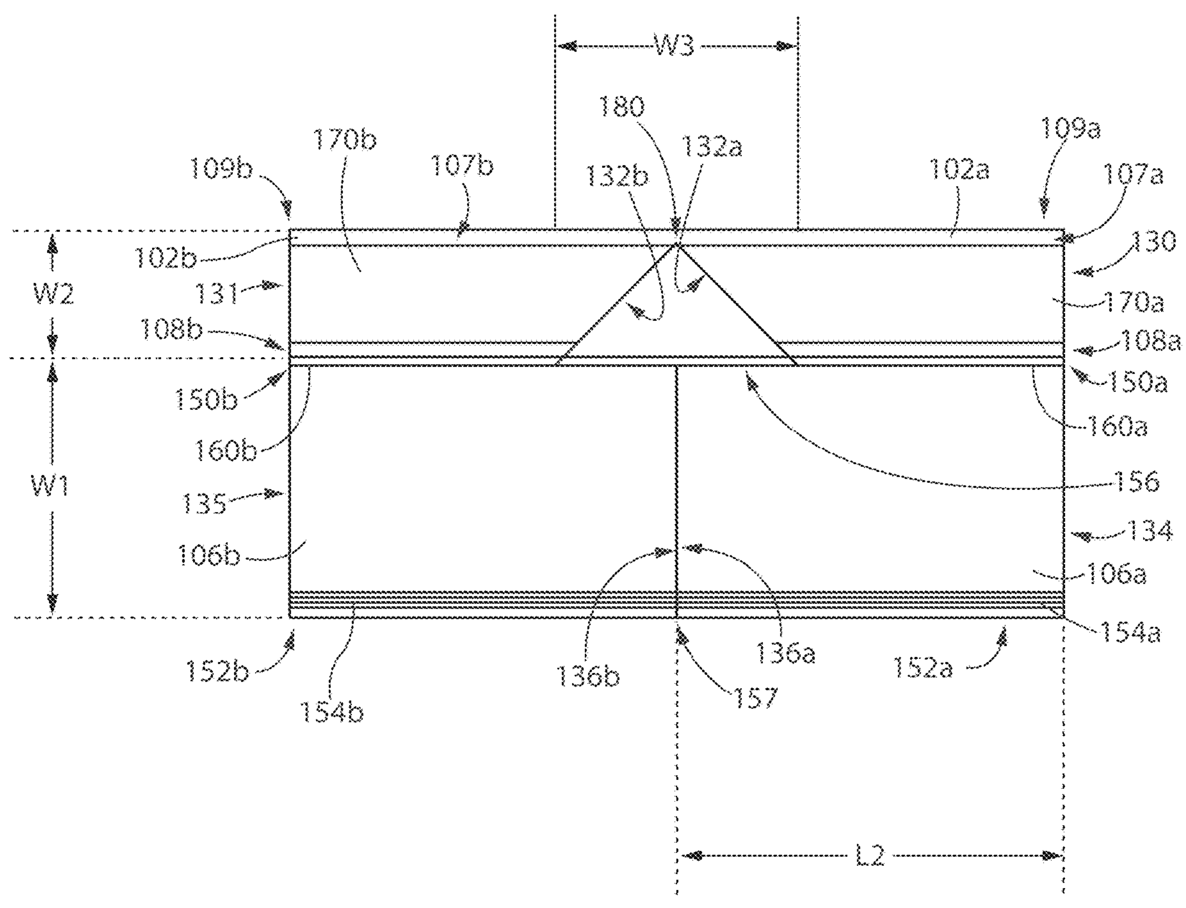
FIG. 3 shows a bottom plan view of the embodiment of FIG. 2.
Figure 4:
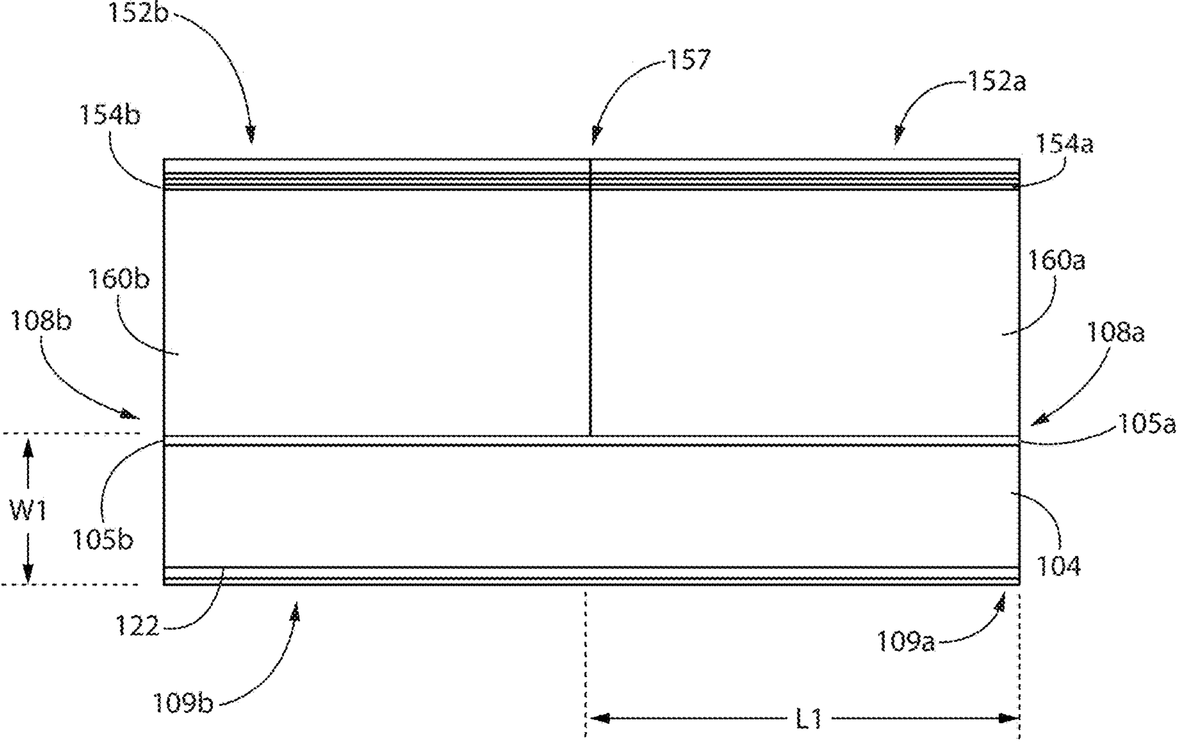
FIG. 4 shows a top plan view of the embodiment of FIG. 2.

With reference to FIGS. 3-4, because the notch 156 splits the base 102 into two distinct portions, and the slit 157 separates the flap seal 106 into two distinct portions, the seal 100 can be characterized as having a first base 102*a* (or first base portion) and a second base 102*b* (or second base portion), and a first flap seal 106*a* (or first flap seal portion) and a second flap seal 106*b* (or second flap seal portion). The first base 102*a* can have a first front end 108*a*, a first back end 109*a* opposite the first front end 108*a*, a first lateral side 130*a* adjacent to the first front end 108*a* and the first back end 109*a*, and a first medial side 132*a* opposite the first lateral side 130*a* and adjacent to the first front end 108*a* and the first back end 109*a*, the first medial side 132*a* forming part of the notch 156. The first base 102*a* also has a first surface 105*a* adjacent to the bulb 104, and a second surface 107*a* opposite the first surface 105*a*.

A first flap seal 106*a* can extend from the first front end 108*a* of the first base 102*a*, the first flap seal 106*a* having a first proximal end 150*a*, and a first free end 152*a*, the first proximal end 150*a* operatively connected to the first base 102*a*. The first flap seal 106*a* also has a first lateral end 134*a* adjacent to the first proximal end 150*a* and the first free end 152*a*, and a first medial end 136*a* opposite the first lateral end 134*a* and adjacent to the first proximal end 150*a* and the first free end 152*a*. The first flap seal 106*a* and the first base 102*a* are generally planar. As such, in the preferred embodiment, the first flap seal 106*a* extends generally in the same plane as the first base 102*a*, although the first flap seal 106*a* can be thicker than the first base 102*a*.

At about the junction where the first flap seal 106*a* and first base 102*a* meet, there can be a first stop 160*a* projecting perpendicularly from the second surface 107*a* in the direction opposite the bulb seal 104. At about the junction where the first flap seal 106*a* and first base 102*a* meet, there can also be a first step projecting perpendicularly from the first surface 105*a* opposite the first stop 160*a*. As such, the first step projects in the direction of the bulb seal 104. The height of the first step projecting towards the bulb seal 104 is preferably smaller than the height of the first stop 160*a* projecting away from the bulb seal 104. The first stop 160*a* and the first step can extend the full length L1 of the first base 102*a*.

In some embodiments, the first stop 160*a* and/or the first step can stop short of the first medial side 132*a*. The extent to which the first stop 160*a* and/or the first step stops short of the first medial side 132*a* should be enough so as not to obstruct or overlap with the second flap seal 106*b* when the seal 100 is bent into its 90 degree angle. In other words, the first stop 160*a* and/or the first step can stop short of at least approximately the full length L2 of the second flap seal 106*b*.

Adjacent to the first free end 152*a* of the first flap seal 106*a* is a first ridge 154*a* that projects perpendicularly from the first flap seal 106*a* on opposite sides. Preferably, there is a first plurality of ridges 154*a* parallel to each other projecting from the first flap seal 106*a* on opposite sides.

The second base 102*b* and the second flap seal 106*b* are essentially mirror images of the first base 102*a* and the first flap seal 106*a*. Therefore, the second base 102*b* can have a second front end 108*b*, a second back end 109*b* opposite the second front end 108*b*, a second lateral side 131 adjacent to the second front end 108*b* and the second back end 109*b*, and a second medial side 132*b* opposite the second lateral side 131 and adjacent to the second front end 108*b* and the second back end 109*b*. The second medial side 132*b* forms the other side of the notch 156 opposite the first medial side 132*a*. The second base 102*b* also has a first surface 105*b* adjacent to the bulb 104, and a second surface 107*b* opposite the first surface 105*b*.

A second flap seal 106*b* can extend from the second front end 108*b* of the second base 102*b*, the second flap seal 106*b* having a second proximal end 150*b*, and a second free end 152*b*, the second proximal end 150*b* operatively connected to the second base 102*b*. The second flap seal 106*b* also has a second lateral end 135 adjacent to the second proximal end 150*b* and the second free end 152*b*, and a second medial end 136*b* opposite the second lateral end 135 and adjacent to the second proximal end 150*b* and the second free end 152*b*. The second flap seal 106*b* and the second base 102*b* are generally planar. As such, in the preferred embodiment, the second flap seal 106*b* extends generally in the same plane as the second base 102*b*, although the second flap seal 106*b* can be thicker than the second base 102*b*.

At about the junction where the second flap seal 106*b* and second base 102*b* meet, there can be a second stop 160*b* projecting perpendicularly from the second surface 107*b* of the second base 102*b* in the direction opposite the bulb seal 104. At about the junction where the second flap seal 106*b* and second base 102*b* meet, there can also be a second step projecting perpendicularly from the first surface 105*b* opposite the second stop 160*b*. As such, the second step projects in the direction of the bulb seal 104. The height of the second step projecting towards the bulb seal 104 is preferably smaller than the height of the second stop 160*b* projecting away from the bulb seal 104.

In some embodiments, the second stop 160*b* and/or the second step can stop short of the second medial side 132*b*. The extent to which the second stop 160*b* and/or the second step 162*b* stops short of the second medial side 132*b* should be enough so as not to obstruct or overlap with the first flap seal 106*a* when the seal 100 is bent into its 90 degree angle. In other words, the second stop 160*b* and/or the second step 162*b* should stop short at least approximately the length L2 of the first flap seal 106*a*.

At the second free end 152*b* of the second flap seal 106*b* is a second ridge 154*b* that projects perpendicularly from the second flap seal 106*b* on opposite sides. Preferably, there is a second plurality of ridges 154*b* parallel to each other.

To allow for the seal 100 to conform to a corner of a wall, a slit 157 is created in between the first flap seal 106*a* and the second flap seal 106*b*, and a notch 156 in between the first base 102*a* and the second base 102*b*. Specifically, the notch 156 is created in between the first medial side 132*a* and the second medial side 132*b* of the bases 102*a*, 102*b*. As such, the notch 156 is formed in the base 102 by the pair of medial sides 132*a*, 132*b* in between the lateral sides 130, 131. The slit 157 extends the full width W1 of the flap seals 106*a*, 106*b* from the free ends 152*a*, 152*b* of the first and second flap seals 106*a*, 106*b* to the proximal ends 150*a*, 150*b* of the flap seals 106*a*, 106*b*. The notch 156 extends substantially the width W2 of the bases 102*a*, 102*b* from the front ends 108a, 108b to the back ends 109a, 109b of the first and second bases 102a, 102b.

The width W3 of the notch 156 from the medial side 132a of the first base 102a to the medial side 132b of the second base 102b (or the medial side 136a of the first flap seal 106a to the medial side 136b of the second flap seal 106b) is sufficiently wide to allow the first base 102a to bend 90 degrees relative to the second base 102b causing the first medial side 132a to be adjacent to and aligned with the second back end 109b of the second base 102b. Similarly, the second medial side 132b is placed adjacent to and aligned with the first back end 109a of the first base 102a. Either the first flap seal 106a can slide over the second flap seal 106b, or the second flap seal 106b can slide over the first flap seal 106a. In either case, the bulb seal 104 need not be lifted up to slide one of the flap seals 106a, 106b underneath the bulb seal 104 into the gap 140.

In the preferred embodiment, the notch 156 can be cut in the shape of a triangle with the apex 180 of the triangle adjacent to the back ends 109a, 109b of the first and second bases 102a, 102b. As such, the medial sides 132a, 132b of the first and second bases 102a, 102b taper towards each other moving from the front ends 108a, 108b towards the back ends 109a, 109b of the first and second bases 102a, 102b where the medial sides 132a, 132b meet at the apex 180. In the preferred embodiment, the angle formed by the medial sides 132a, 132b at the apex 180 is preferably about 90 degrees. However, the angle at the apex 180 created by the medial sides 132a, 132b can be less than 90 degrees. In some embodiments, the angle at the apex 180 created by the medial sides 132a, 132b can be about 80 degrees or less. In some embodiments, the angle at the apex 180 created by the medial sides 132a, 132b can be about 70 degrees or less. In some embodiments, the angle at the apex 180 created by the medial sides 132a, 132b can be about 60 degrees or less. In some embodiments, the angle at the apex 180 created by the medial sides 132a, 132b can be about 45 degrees or less. In some embodiments, the angle at the apex 180 created by the medial sides 132a, 132b can be about 30 degrees or less.

In a preferred embodiment, the width W3 of the notch 156 at its widest point, which would be measured at the front end 108a, 108b of the first and second bases 102a, 102b, can be about 1.885 inches. However, the width W3 of the notch 156 at its widest point can range from 1.5 inches to about 2.5 inches. More preferably, the width W3 of the notch 156 at its widest point can range from 1.8 inches to about 2.0 inches.

Figure 6:
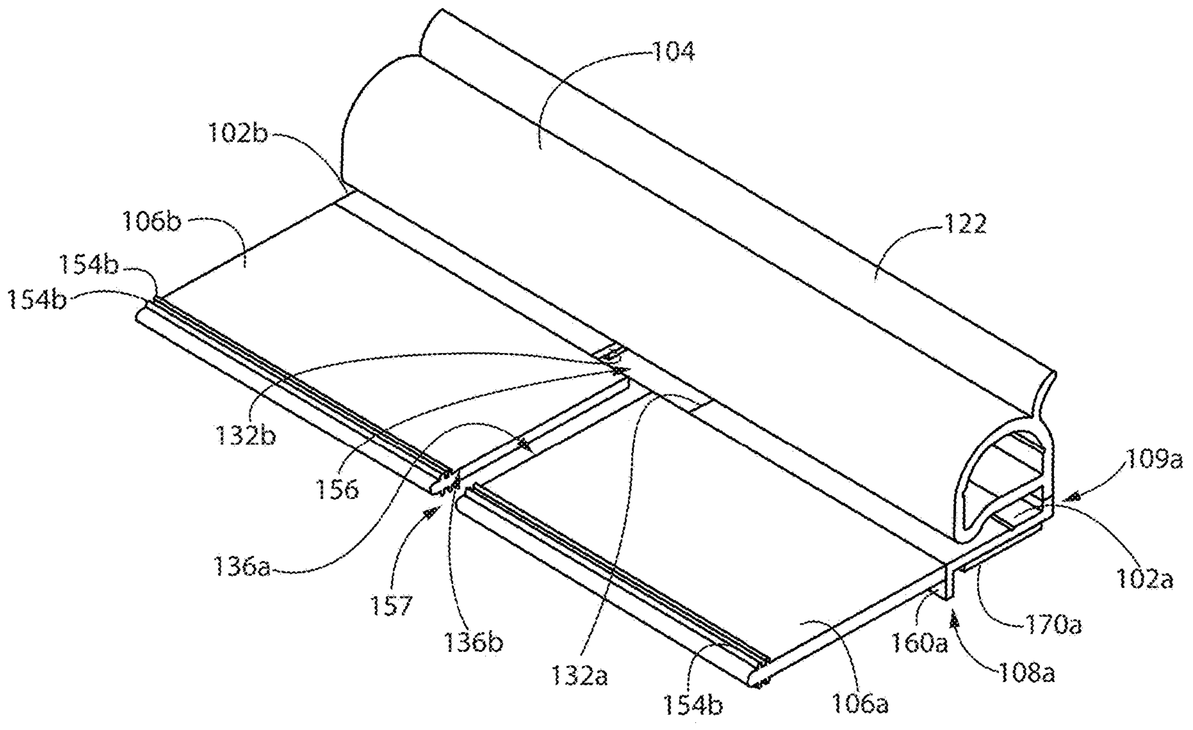
FIG. 6 shows a perspective view of a section of another embodiment of the present invention that is substantially the same as the embodiment shown in FIG. 2, except for the configuration of the notch and the slit.
Figure 7:
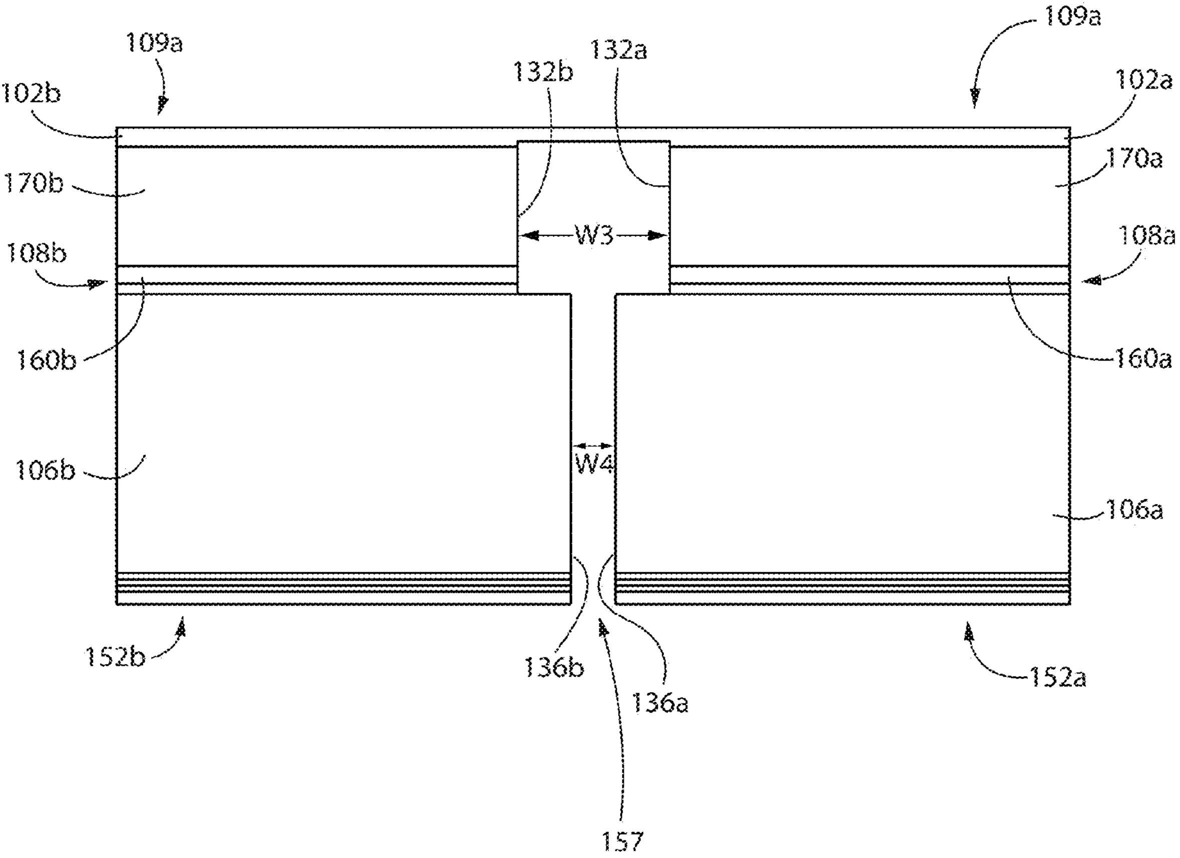
FIG. 7 shows a bottom plan view of the embodiment of FIG. 6.

With reference to FIGS. 6 and 7, in some embodiments, the notch 156 is rectangular in shape. As such, the medial sides 132a, 132b defining the notch 156 can be substantially parallel to each other moving from the front ends 108a, 108b to the back ends 109a, 109b of the first and second bases 102a, 102b. The notch 156 can have a width W3 of approximately 0.95 inch as measured from the first medial side 132a to the second medial side 132b. However, the width W3 of the notch 156 can range from about 0.75 inch to about 1.5 inch. Preferably, the width W3 of the notch is about 0.8 inch to about 1.25 inch. More preferably, the width W3 of the notch 156 is about 0.9 inch to about 1.1 inch.

The slit 157 created between the first flap seal 106a and the second flap seal 106b can have a width W4 of about 0.50 inch or less. In some embodiments, the width W4 of the slit 157 created between the first flap seal 106a and the second flap seal 106b can be about 0.010 inch to about 0.250 inch. In some embodiments, the width W4 of the slit 157 created between the first flap seal 106a and the second flap seal 106b can be up to about 1 inch. In some embodiments, the medial ends 136a, 136b of the first and second flap seals 106a, 106b essentially abut against each other, thereby creating a width W4 that is effectively zero.

As such, a variety of configurations can be created using notches 156 between bases 102a, 102b that are rectangular or triangular in shape, and with narrow (0.010 inch or less) to wide (0.50 inch) slits 157 between the flap seals 106a, 106b.

Figure 5:
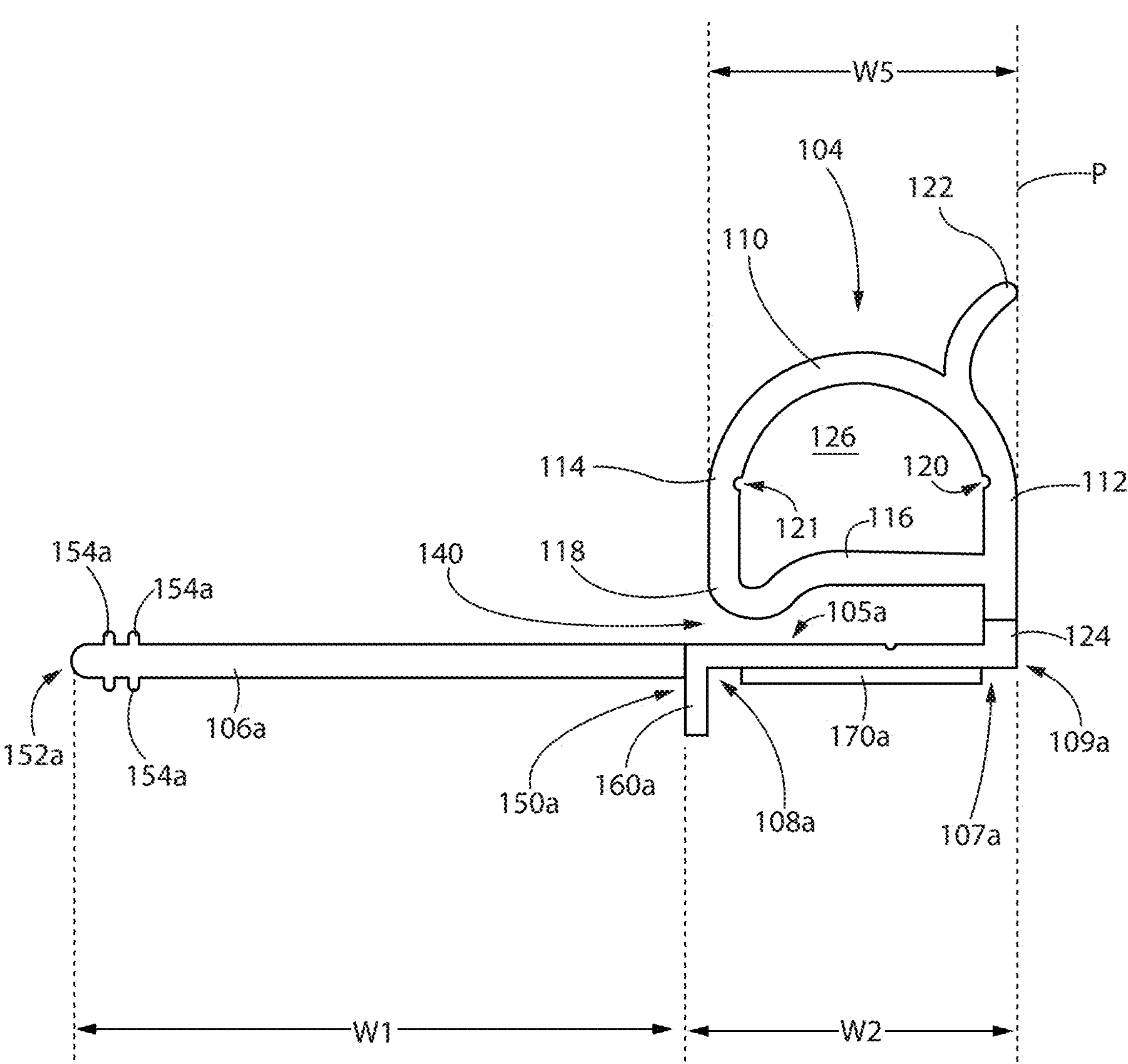
FIG. 5 shows a side view of the embodiment of FIG. 2.

In order to achieve the bent configuration, either the first flap seal 106a or the second flap seal 106b must slide underneath the bulb seal 104. As such, as shown in FIG. 5, a gap 140 must be created in between the bulb seal 104 and the first and second bases 102a, 102b. The gap 140 is configured to receive a portion of either of the first flap seal 106a or the second flap seal 106b. A gap 140 can be created between the bulb seal 104 and the bases 102a, 102b using a back wall 124 extending perpendicularly from the first back end 109a and the second back end 109b towards the bulb seal 104. The back wall 124 operatively connects the first base 102a and the second base 102b to each other and to the bulb seal 104. The back wall 124 is a flat wall defining a plane P. In some embodiments, the notch 156 may pass through a portion of the back wall 124 adjacent to the first and second bases 102a, 102b, thereby extending the notch 156 into a portion of the back wall 124.

The bulb seal 104 extends from the back wall 124 opposite the first base 102a and the second base 102b. As such, the bulb seal 104 is separated from the first base 102a and the second base 102b by the gap 140 due to the back wall 124. The gap 140 is large enough to allow the first flap seal 106a or the second flap seal 106b to slide in between the base 102a, 102b and the bulb seal 104.

The bulb seal 104 comprises a floor 116 extending perpendicularly from the back wall 124; a first wall 112 extending from and parallel to the back wall 124, and perpendicular to the floor 116; a second wall 114 opposite the first wall 112, the second wall 114 connected to the floor 116; and an arch 110 connecting the first wall 112 to the second wall 114 opposite the floor 116. As such, the bulb seal 104 has a generally D-shaped profile.

In the preferred embodiment, the bulb seal 104 further comprises a lip 118 adjacent to the second wall 114 and the floor 116. The lip 118 protrudes towards the first base 102a and the second base 102b narrowing a portion of the gap 140.

The bulb seal 104 has a hollow interior cavity 126 defined by the first wall 112, the second wall 114, the arch 110 and the floor 116. The interior sides of the first wall 112 and second wall 114 may each comprise a notch 120, 121. A first notch 120 can be on the first wall 112 adjacent to the arch 110, and the second notch 121 can be on the second wall 114 adjacent to the arch 110.

Preferably, a horn 122 extends from the bulb seal 104 above the first wall 112, and curves towards the plane P of the back wall 124. More preferably, the horn 122 extends up to the plane P of the back wall 124.

To facilitate installation of the seal 100, a first fastener 170a can be applied to the second surface 107a of the first base 102b, and a second fastener 170b can be applied to the second surface 107b of the second base 102b. Preferably, the first and second fasteners 170a, 170b are adhesives, but other fasteners can be used such as nails, screws, staples, and the like. In use, the first fastener 170a can be exposed and the first base 102a can be aligned with a first portion of a wall that defines a rectangular opening by aligning the first stop 160a against the edge of the first portion of the wall to assure straight alignment. The first base 102a can be fastened onto the first wall using the first fastener 170*a*. The second fastener 170*b* can be exposed on the second base 102*b*. The second base 102*b* can be bent at approximately 90 degrees to the first base 102*a*, and aligned with a second portion of the wall that is adjacent and 90 degrees to the first portion of the wall (thereby forming a corner with the first wall) using the second stop 160*b*. While bending the second base 102*b* 90 degrees relative to the first base 102*a*, the second flap seal 106*b* can be slid under the bulb seal 104 into the gap 140 defined by the floor 116 of the bulb seal 104 and the top side 105*a* of the first base 102*a* without lifting the bulb seal 104. Alternatively, the second flap seal 106*b* can be slid underneath the first flap seal 106*a* so that the first flap seal 106*a* slides underneath the bulb seal 104 into the gap 140 defined by the floor 116 of the bulb seal 104 and the top side 105*b* of the second base 102*b*. The second base 102*b* can be fastened to the second wall using the second fastener 170*b*. The sequence of steps is not limiting so long as the seal 100 is fastened to the corner of the wall with the first base 102*a* at a 90 degree angle relative to the second base 102*b*. When attached in this arrangement, the horn 122 creates a water management gutter system to drastically increase the sealing effects of the seal 100. If desired, fastening of the seal 100 can be made more secure with additional fasteners such as screws or nails driven through the first and second bases 102*a*, 102*b* into the wall.

In some embodiments, the height of the bulb seal 104 as measured from the bottom side 107*a*, 107*b* of the base 102*a*, 102*b* to the top of the arch 110 is preferably approximately 1.2 inches. The height of the bulb seal can range from about 0.75 inch to about 1.75 inch. Preferably, the height of the bulb seal 104 can range from about 1 inch to about 1.5 inch. More preferably, the height of the bulb seal 104 can range from about 1.2 inch to about 1.3 inch. In one embodiment, the width W5 of the bulb seal 104 measured from the outside of the first wall 112 to the outside of the second wall 114 is 0.9 inch. The width W5 of the bulb seal 104 can range from about 0.5 inch to about 1.5 inch. Preferably, the width W5 of the bulb seal 104 can range from about 0.75 inch to about 1.25 inch. More preferably, the width W5 of the bulb seal 104 can range from about 0.9 inch to about 1 inch.

In some embodiments, the width W2 of the base 102*a*, 102*b* as measured from the front end 108*a*, 108*b* to the back end 109*a*, 109*b* is 0.96 inch. The width W2 of the base 102*a*, 102*b* can range from about 0.5 inch to about 1.5 inch. Preferably, the width W2 of the base 102*a*, 102*b* can range from about 0.75 inch to about 1.25 inch. More preferably, the width W2 of the base 102*a*, 102*b* is about 0.9 inch to about 1.0 inch.

In some embodiments, the flap seal 106*a*, 106*b* has a width W1 as measured from its proximal end 150*a*, 150*b* to its free end 152*a*, 152*b* of about 2.5 inches. The width W1 of the flap seal 106*a*, 106*b* can range from about 1.5 inches to about 3.5 inches. Preferably, the width W1 of the flap seal 106*a*, 106*b* can range from about 2 inches to about 3 inches. More preferably, the width W1 of the flap seal 106*a*, 106*b* can range from about 2.25 inches to about 2.75 inches.

In some embodiments, the width W3 of the notch as measured from the medial side 132*a* of the first base 102*a* to the medial side 132*b* of the second base 102*b* can range from about 0.75 inch to about 1.5 inch. Preferably, the width W3 of the notch is about 0.8 inch to about 1.25 inch. More preferably, the width W3 of the notch is about 0.9 inch to about 1.1 inch. Most preferably, the width W3 of the notch 156 changes as the notch 156 is in the shape of a triangle.

The slide seal 100 can be manufactured using plastic extrusion techniques, including multi-extrusion techniques, such as co-extrusion or tri-extrusion. Using multi-extrusion techniques allows the different components, such as the base 102*a*, 102*b*, the bulb seal 104, flap seal 106*a*, 106*b*, and other components can be made with different material, hardness, or flexibility as desired. The material for the various components may be EPDM rubber. They can also be manufactured with plastic using TPV, TPO and TPE, or any combination thereof.

The notch 156 and the slit 157 can be cut out after the seal is formed. The notch 156 and the slit 157 can be cut out using typical cutting tools. In some embodiments, a special cutter can be developed to make the desired shape cut of the notch 156 and slit 157.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A seal for sealing a space between a corner of slide-out room and a wall of a recreational vehicle, the seal comprising:

a) a base having a front end, a back end opposite the front end, a first lateral side adjacent to the front end and the back end, a second lateral side opposite the first lateral side and adjacent to the front end and the back end, a first surface adjacent to the first lateral side, the second lateral side, the front end, and the back end, and a second surface opposite the first surface and adjacent to the first lateral side, the second lateral side, the front end, and the back end;

b) a bulb seal attached to the base at the back end adjacent to the first surface;

c) a flap seal attached to the base at the front end, the flap seal comprising a proximal end attached to the base, a free end opposite the proximal end, a first lateral end adjacent to the proximal end and the free end, and a second lateral end opposite the first lateral end and adjacent to the proximal end and the free end, wherein the flap seal and the base are coplanar, wherein the base defines a notch in between the first lateral side and the second lateral side that extends from the front end of the base substantially to the back end of the base, wherein the notch has a width of about 0.75 inch to about 2.5 inch, and wherein the flap seal defines a slit in between the first lateral end of the flap seal and the second lateral end of the flap seal, the slit extending from the notch through the free end of the flap seal, wherein the notch is configured to allow the base to bend 90 degrees at the notch, wherein the slit has a width of 0.50 inch or less; and d) a gap in between the bulb seal and the base, wherein the gap is configured to receive the flap seal without lifting up the bulb seal.

2. The seal of claim 1, wherein the notch is triangular in shape.

3. A seal for sealing a space between a corner of slide-out room and a wall of a recreational vehicle, the seal comprising:

a) a base having a front end, a back end opposite the front end, a first lateral side adjacent to the front end and the back end, a second lateral side opposite the first lateral side and adjacent to the front end and the back end, a first surface adjacent to the first lateral side, the second lateral side, the front end, and the back end, and a second surface opposite the first surface and adjacent to the first lateral side, the second lateral side, the front end, and the back end;

b) a bulb seal attached to the base at the back end adjacent to the first surface;

c) a flap seal attached to the base at the front end, the flap seal comprising a proximal end attached to the base, a free end opposite the proximal end, a first lateral end adjacent to the proximal end and the free end, and a second lateral end opposite the first lateral end and adjacent to the proximal end and the free end, wherein the base defines a notch in between the first lateral side of the base and the second lateral side of the base that extends from the front end towards the back end, and wherein the flap seal defines a slit in between the first lateral end of the flap seal and the second lateral end of the flap seal, leading to the notch, the slit extending from the notch through the free end, wherein the notch is configured to allow the base to bend 90 degrees at the notch, wherein the notch has a width at the front end of the base and the slit has a width extending along the flap seal, wherein the width of the notch is greater than the width of the slit; and d) a gap in between the bulb seal and the base, wherein the gap is configured to receive the flap seal without lifting up the bulb seal when the base is bent at 90 degrees.

4. The seal of claim 3, wherein the notch is defined by a pair of medial sides formed in the base in between the first lateral side and second lateral side.

5. The seal of claim 4, wherein the medial sides taper toward each other moving from the front end to the back end of the base to form a triangular shape.

6. The seal of claim 5, wherein the pair of medial sides form an apex at the back end of the base, wherein the apex defines an angle of about 30 degrees to about 90 degrees.

7. The seal of claim 6, wherein the width of the notch at the front end of the base opposite the apex is about 1.5 inch to about 2.5 inches.

8. The seal of claim 7, wherein the width of the slit in the flap seal is about 0.50 inch or less.

9. The seal of claim 8, wherein the bulb seal extends from a back wall extending from the base at the back end to create a gap between the bulb seal and the base, wherein the gap is configured to receive a portion of the flap seal.

10. The seal of claim 9, wherein the bulb seal comprises a floor extending perpendicularly from the back wall of the base; a first wall extending from and parallel to the back wall, and perpendicular to the floor; a second wall opposite the first wall, the second wall connected to the floor; an arch connecting the first wall to the second wall opposite the floor; and a lip adjacent to the second wall and the floor, the lip protruding towards the base to narrow a portion of the gap.

11. The seal of claim 10, wherein the bulb seal further comprises a horn extending above the first wall, and curving towards a plane defined by the back wall.

12. The seal of claim 4, wherein the medial sides are parallel to each other moving from the front end to the back end of the base to form a rectangular shape.

13. The seal of claim 4, wherein the width of the notch at the front end of the base opposite the apex is about 1.5 inches to about 2.5 inches.

14. The seal of claim 4, wherein the width of the slit in the flap seal is less than about 0.50 inch.

15. The seal of claim 4, wherein the bulb seal extends from a back wall opposite the base to create a gap between the bulb seal and the base, wherein the gap is configured to receive a portion of the flap seal.

16. The seal of claim 15, wherein the bulb seal comprises a floor extending perpendicularly from the back wall of the base; a first wall extending from and parallel to the back wall, and perpendicular to the floor; a second wall opposite the first wall, the second wall connected to the floor; an arch connecting the first wall to the second wall opposite the floor; and a lip adjacent to the second wall and the floor, the lip protruding towards the base to narrow a portion of the gap.

17. The seal of claim 16, wherein the bulb seal further comprises a horn extending above the first wall, and curving towards a plane defined by the back wall.

18. A method of sealing a corner space between a slide-out room and a wall of a recreational vehicle, comprising:

a) providing a seal comprising a base, a bulb seal attached to the base, a flap seal attached to the base opposite the bulb seal, a gap in between the bulb seal and the base, a notch defined in the base dividing the base into a first base portion and a second base portion, and a slit defined in the flap seal dividing the flap seal into a first flap seal portion, and a second flap seal portion, wherein each base portion comprises a front end, a back end opposite the front end, a lateral side adjacent to the front end and the back end, a medial side opposite the lateral side and adjacent to the front end and the back end, a first surface adjacent to the lateral side, the medial side, the front end, and the back end, and a second surface opposite the first surface and adjacent to the lateral side, the medial side, the front end, and the back end, wherein the bulb seal is attached to each base portion at the respective back ends adjacent to the first surfaces, wherein each flap seal portion is attached to the base at the front end, the flap seal comprising a proximal end attached to the base, a free end opposite the proximal end, a lateral end adjacent to the proximal end and the free end, and a medial end opposite the lateral end and adjacent to the proximal end and the free end, wherein the notch extends substantially from the front end towards the back end of each base portion, wherein the slit extends substantially from the notch through the free end of each flap seal portion, and wherein the notch has a width at the front end that is greater than a width of the slit;

b) fastening the first base portion onto a first portion of a corner of a wall with a first fastener;

c) bending the seal at the notch so that the second base portion is perpendicular to the first base portion;

d) sliding one of the first flap seal portion or the second flap seal portion under the bulb seal into the gap defined by the bulb seal and the base without lifting the bulb seal;

e) aligning the second base portion with a second portion of the corner of the wall; and f) fastening the second base portion to the second portion of the corner of the wall with a second fastener.

19. The method of claim 18, wherein aligning the first base portion with the first portion of the corner of the wall comprises abutting a first stop, projecting from the second surface of the first base portion at the front end, against a first edge of the first portion of the corner of the wall.

20. The method of claim 19, wherein aligning the second base portion with the second portion of the corner of the wall comprises abutting a second stop, projecting from the second surface of the second base portion at the front end, against a second edge of the second portion of the corner of the wall.

* * * * *